US010331925B2

(12) United States Patent
Georgallis (10) Patent No.: US 10,331,925 B2
(45) Date of Patent: Jun. 25, 2019

(54) APPARATUS AND METHOD FOR GENERATING A SPEAKER INSTALLATION CODE FOR A SPEAKER ARRAY IN A VENUE

(71) Applicant: Harman International Industries, Incorporated, Stamford, CT (US)

(72) Inventor: George Georgallis, Woodland Hills, CA (US)

(73) Assignee: HARMAN INTERNATIONAL INDUSTRIES, INCORPORATED, Stamford, CT (US)

( * ) Notice: Subject to any disclaimer, the term of this patent is extended or adjusted under 35 U.S.C. 154(b) by 0 days.

(21) Appl. No.: 15/935,940

(22) Filed: Mar. 26, 2018

(65) Prior Publication Data
US 2018/0285612 A1 Oct. 4, 2018

Related U.S. Application Data

(60) Provisional application No. 62/479,902, filed on Mar. 31, 2017.

(51) Int. Cl.
| | | |
|---|---|---|
| G06F 17/00 | (2019.01) | |
| G06K 7/10 | (2006.01) | |
| H04R 27/00 | (2006.01) | |
| G06K 7/14 | (2006.01) | |
| G06K 19/06 | (2006.01) | |
| H04R 29/00 | (2006.01) | |

(52) U.S. Cl.
CPC ....... *G06K 7/10722* (2013.01); *G06K 7/1413* (2013.01); *G06K 7/1417* (2013.01); *G06K 19/06018* (2013.01); *G06K 19/06037* (2013.01); *H04R 27/00* (2013.01); *H04R 29/007* (2013.01)

(58) Field of Classification Search
CPC ....... G06Q 30/02; G07F 7/1008; G06K 17/00
USPC .......................................................... 235/375
See application file for complete search history.

(56) References Cited

U.S. PATENT DOCUMENTS

| | | | |
|---|---|---|---|
| 6,728,222 B1 * | 4/2004 | Ono | H04L 12/1813 370/260 |
| 8,942,395 B2 | 1/2015 | Lissaman et al. | |
| 10,142,752 B2 * | 11/2018 | Du | H04R 3/12 |
| 2005/0008165 A1 * | 1/2005 | Sack | H04R 1/026 381/59 |

(Continued)

OTHER PUBLICATIONS

D&B Audiotechnik GmbH, "TI 385 (4.2 EN) d&b Line array design, ArrayCalc V7", Mar. 1, 2014, 58 pages.

*Primary Examiner* — Ahshik Kim
(74) *Attorney, Agent, or Firm* — Brooks Kushman P.C.

(57) ABSTRACT

In at least one embodiment, an apparatus for generating a speaker installation code for a speaker array in a venue is provided. The apparatus includes a memory device and a controller. The controller is operably coupled to the memory device. The controller is programmed to receive venue dimensional layout information for the venue and to generate a speaker installation code corresponding to speaker array installment parameters for the speaker array in the venue based on the venue dimensional layout information. The controller is further configured to transmit the speaker installation code to one or more mobile devices to provide the speaker array installment parameters for the speaker array in the venue to the one or more mobile devices.

20 Claims, 11 Drawing Sheets

(56) References Cited

U.S. PATENT DOCUMENTS

| | | | | |
|---|---|---|---|---|
| 2012/0113224 A1* | 5/2012 | Nguyen | ............... | G06K 9/0057 348/46 |
| 2013/0321133 A1* | 12/2013 | Michaelis | ............. | H04M 3/569 340/10.42 |
| 2017/0006162 A1* | 1/2017 | Bargetzi | ................ | H04N 7/147 |

* cited by examiner

APPARATUS AND METHOD FOR GENERATING A SPEAKER INSTALLATION CODE FOR A SPEAKER ARRAY IN A VENUE

CROSS-REFERENCE TO RELATED APPLICATIONS

This application claims the benefit of U.S. provisional Application No. 62/479,902 filed on Mar. 31, 2017, the disclosure of which is hereby incorporated by reference in its entirety herein.

TECHNICAL FIELD

Aspects disclosed herein generally relate to an apparatus and method for generating a speaker installation code for a speaker array in a venue. These aspects and others will be discussed in more detail herein.

BACKGROUND

U.S. Pat. No. 8,942,395 to Lissman et al. discloses a pointing element enhanced speaker system that addresses the need for consistent sound. Despite wide variations in the design and architecture of different venues, the system helps performers ensure that they deliver the desired sound for their audiences. Performers and their technicians, though faced with grueling schedules that impose severe time constraints on equipment setup and tuning as the performers move between venues, may turn to the system to provide the sound desired at each new venue.

SUMMARY

In at least one embodiment, an apparatus for generating a speaker installation code for a speaker array in a venue is provided. The apparatus includes a memory device and a controller. The controller is operably coupled to the memory device. The controller is programmed to receive venue dimensional layout information for the venue and to generate a speaker installation code corresponding to speaker array installment parameters for the speaker array in the venue based on the venue dimensional layout information. The controller is further configured to transmit the speaker installation code to one or more mobile devices to provide the speaker array installment parameters for the speaker array in the venue to the one or more mobile devices.

In at least another embodiment, a computer-program product embodied in a non-transitory computer readable medium that is programmed to generate a speaker installation code for a speaker array in a venue is provided. The computer-program product comprising instructions to receive venue dimensional layout information for the venue and to generate a speaker installation code corresponding to speaker array installment parameters for the speaker array in the venue based on the venue dimensional layout information. The computer-program product further comprises instructions to transmit the speaker installation code to one or more mobile devices to provide the speaker array installment parameters for the speaker array in the venue to the one or more mobile devices.

In at least another embodiment, an apparatus for receiving a speaker installation code for a speaker array in a venue is provided. The apparatus includes a mobile device having a memory device and a controller. The controller is coupled to the memory device. The controller is programmed to receive a speaker installation code from a computing device, the speaker installation code corresponding to speaker array installment parameters for the speaker array in the venue and to provide the speaker installation code on a display to provide the speaker array installment parameters for the speaker array in the venue.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompany drawings in which:

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

It is recognized that the controllers as disclosed herein may include various microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof), and software which co-act with one another to perform operation(s) disclosed herein. In addition, such controllers as disclosed utilize one or more microprocessors to execute a computer-program that is embodied in a non-transitory computer readable medium that is programmed to perform the functions as disclosed. Further, the controller(s) as provided herein includes a housing and the various number of microprocessors, integrated circuits, and memory devices ((e.g., FLASH, random access memory (RAM), read only memory (ROM), electrically programmable read only memory (EPROM), electrically erasable programmable read only memory (EEPROM)) positioned within the housing. The controller(s) as disclosed also include hardware based inputs and outputs for transmitting and receiving data, respectively, to and from other hardware based devices as discussed herein.

Typically, a system engineer is the first crew member to arrive at a venue at the start of a day to initiate the setup of a speaker array within the venue to prepare for a concert or other gathering that plays back audio data. The system engineer takes a number of measurements of the venue via laser measurement tools and a computing device executes a virtual venue prediction software in response to the measurements of the venue. After the venue is drawn (or the layout of the venue is known), the computer generates a number of desired speaker arrays to be deployed to adequately cover the venue with sound. However, in this case, the system engineer may not be able to access information pertaining to the desired speaker arrays as generated by the computing device. For example, in very large venues, it is difficult to establish a WIFI connection (or an internet connection) between the system engineer's mobile device and the computing device to obtain information corresponding to the number of desired speaker arrays. In many cases, the system engineer is required to show up at the venue very early in the morning to have the speaker arrays assembled and mounted to the venue to prepare for a sound check that will occur later in the morning. In these cases, authorized personnel at the venue may even not be present to provide a WIFI password to establish electronic communication with the computing device that generates/provides the desired speaker arrays to the system engineer. Thus, the system engineer experiences delays in receiving the desired speaker array information and in providing the desired speaker array information from the computing device to other crew members who are responsible for attaching or mounting the speaker arrays in the venue.

To account for these issues, a system as disclosed herein enables a mobile device belonging to a system engineer (or crew member) to capture a speaker installation code (e.g. bar code, QR code, etc.) that indicates speaker array related parameters and that allows the crew to install the system without having to carry a computer around. This can also work for fixed installation applications where the crew installing the sound system has no association to the person that designed the system.

Aspects disclosed herein generally relate to a computing device that generates a speaker installation code (e.g., bar code, QR code, etc.) that corresponds to speaker array installment parameters for a venue (e.g., stadium, concert hall, arena, etc.) to enable one or more crew members to setup various speaker arrays in the venue to playback audio data. For example, the computing device may generate the speaker installation code in response to venue dimensional layout information for the venue. The speaker installation code is generally indicative of specifications for the correct height, angle, weight, etc. of the speaker array(s) to be deployed/assembled in the venue to optimize the play back of audio data within the venue. The computing device includes hardware and software that co-act with one another to generate the speaker installation code. A mobile device belonging to crew member or system engineer receives the speaker installation code (e.g., either wireless transmission or via image capture) and electronically transmits the speaker installation code to other crew members to enable the crew members to start installing the speaker array(s) within the venue in accordance to the speaker installation code or speaker array installment parameters.

Figure 1:
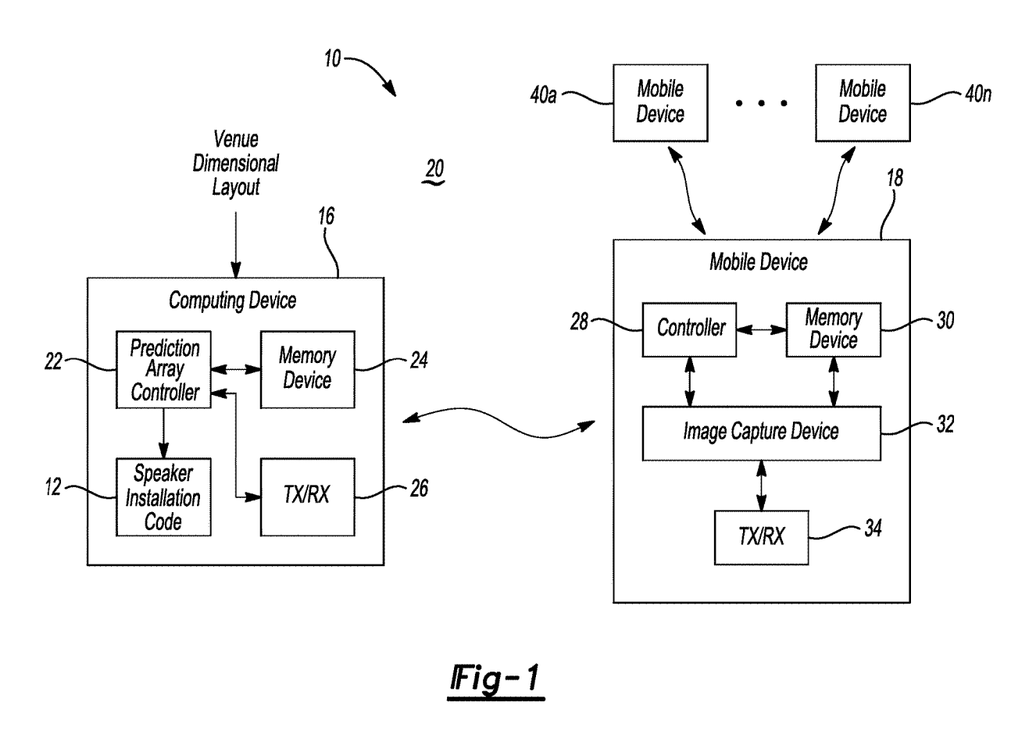
FIG. 1 generally illustrates a system for generating, transmitting, and receiving a speaker installation code for a speaker array in a venue accordance to one embodiment.

FIG. 1 generally illustrates a system 10 for generating, transmitting, and receiving a speaker installation code 12 for a speaker array 20 in a venue 14 in accordance to one embodiment. The system 10 generally includes a computing device 16 and a first mobile device 18. It is recognized that the venue 14 may correspond to a stadium, concert hall, arena, or other facility that is used to enable groups of listeners to listen to music, speeches, etc. Prior to a concert, speech, etc., it is necessary to setup speaker array(s) 20 throughout the venue 14 and to ensure that the speaker array(s) 20 are positioned properly throughout the venue 14 to ensure that the audio data played back by the array(s) 20 is optimized for the listeners' user experience.

Thus, to ensure a proper speaker array setup within the venue 14, the computing device 16 includes a prediction array controller 22 and a memory device 24. The prediction array controller 22 executes speaker array prediction software on the memory device 24 to provide crew members with the optimal or desired placement and positioning of the speaker array(s) 20 in response to a dimensional layout of the venue 14. The computing device 16 may receive electronic data corresponding to the dimensional layout of the venue 14 via user input or via the laser measurement of the venue 14. The speaker array prediction software, when executed on the prediction array controller 22, determines the optimal placement and positioning of the speaker array (s) 20 based on the dimensional layout of the venue 14. The prediction array controller 20 is further configured to generate the speaker installation code 12 which generally provides speaker installation parameters that include specifications for, but not limited to, the number of speakers in an array, the number of speaker arrays, the number of speaker frames, the correct height, angle, weight, etc. of the speaker array(s) 20 for deployment and assembly in the venue 14 to enable optimized play back of the audio data within the venue 14. The speaker installation code 12 may be a bar code, quick response (QR) code, etc. The QR code generally utilizes four standardized encoding modes (e.g., numeric, alphanumeric, byte/binary, and kanji) to store data and to convey information corresponding to the speaker array installation parameters of the speaker array 20. The speaker installation code 12 encodes the speaker installation parameters for the speaker array(s) 20 based on the dimensional layout of the venue 14 within the speaker installation code 12 (or on the bar code, QR code or other designated visual code). The computing device 16 may visually depict the speaker installation code 12 on a display (not shown) thereof.

The computing device 16 generally includes a transceiver 26 that is configured to electronically transmit the speaker array installation parameters to the first mobile device 18 via WIFI, BLUETOOTH, or other suitable protocol to enable a system engineer or crew member to initiate the process of setting up or mounting the speaker array(s) 20 in the venue 14. However, as noted above, in some instances, it is not possible to establish a connection between the computing device 16 and the first mobile device 18 in the venue 14 due to the inability of establishing a connection via WIFI or due to lack of WIFI altogether.

The first mobile device 18 generally includes a controller 28, a memory device 30, an image capture device 32, and a transceiver 34. In the event the first mobile device 18 in unavailable to establish communication with the computing device 16, the crew member may use the first mobile device 18 (or the image capture device 32) to capture an image of the speaker installation code 12 (i.e., bar code or QR code, etc.) to obtain the speaker installation parameters for the speaker array(s) 20 in the venue 14. In addition, the crew member may control the first mobile device 18 to transmit the speaker installation code 12 via text message (e.g., Short Message Service (SMS) to other mobile devices 40a-40n ("40")) that belong to other crew members quickly and easily so that the crew member who are located away from the computing device 16 can initiate the process of installing the speaker array(s) 20 within the venue 14 at the desired locations, height, weight, angle, etc. This communication may be performed without the need for WIFI and ensures that the speaker installation parameters for the speaker array(s) 20 can be transmitted to crew members in a timely manner and to enable crew members to rapidly initiate the process of setting up the speaker array(s) 20.

It is possible that perhaps the first mobile device 18 may communicate with the computing device 16 via BLUETOOTH or other short distance wireless protocol and to receive the speaker installation code 12 within a short-range distance. However, the other mobile device 40 (i.e., other crew members) may be off in distant or remote areas of the venue 14 that exceed the distance to communicate via BLUETOOTH. In this case, the crew member of the first mobile device 18 may transmit the speaker installation code 12 to the other mobile devices 40 rather easily and quickly via SMS without the need for the other mobile devices 40 to be within a short distance of the first mobile device 18. Each of the first mobile device 18 and the other mobile devices 40 may store the speaker installation code in their corresponding memory device 30 and execute a speaker array reader app that decodes the speaker array installation parameters encoded within the speaker installation code 12 to obtain the desired locations, height, weight, angle, etc., of the speaker array(s) 20 for the venue 14. These aspects and others will be discussed in more detail below.

Figure 2:
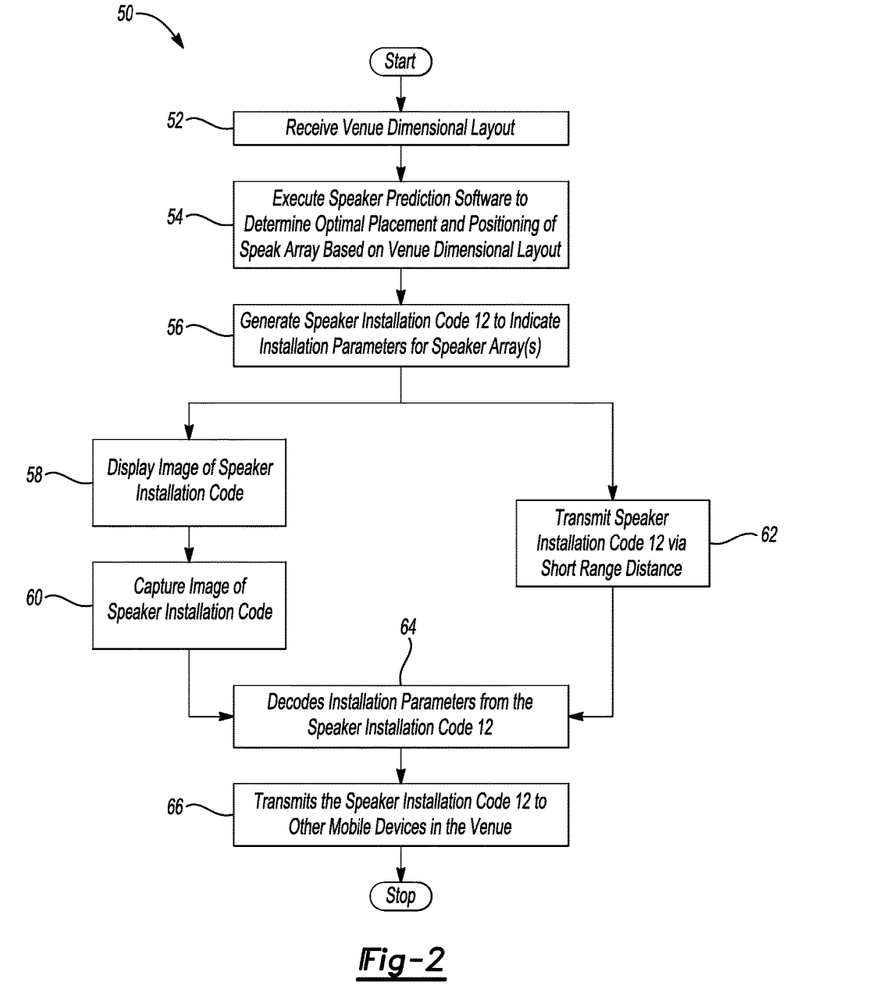
FIG. 2 generally illustrates a method for generating, transmitting, and receiving the speaker installation code in the venue in accordance to one embodiment.

FIG. 2 generally illustrates a method 50 for generating, transmitting, and receiving the speaker installation code 12 in the venue 14 in accordance to one embodiment.

In operation 52, the computing device 16 receives the venue dimensional layout which corresponds to electronic data corresponding to a dimensional layout of the venue 14. The computing device 16 receives the venue dimensional layout via user input or via a laser measurement tool.

In operation 54, the computing device 16 executes speaker prediction software on the prediction array controller 22 to determine optimal placement and positioning of the speaker array(s) 20 based on the dimensional layout of the venue 14.

In operation 56, the computing device 16 generates the speaker installation code 12 based on the dimensional layout of the venue 14. For example, the computing device 16 encodes data corresponding to various speaker installation parameters that include, but not limited to, the number of speakers in an array, the number of speaker arrays, number of speaker frames, the correct height, angle, weight, etc. of the speaker array(s) 20 for deployment. The computing device 16 encodes the foregoing information on the speaker installation code 12.

In operation 58, the computing device 16 displays the speaker installation code 12 on a display thereof.

In operation 60, the first mobile device 18 captures an image of the speaker installation code 12.

In operation 62, the computing device 16 transmits the speaker installation code 12 via BLUETOOTH or other short range wireless protocol in response to a control signal from the first mobile device 18. This operation may be performed as an alternative to operation 60.

In operation 64, the first mobile device 18 decodes the installation parameters that are present on the speaker installation code 12 to ascertain. but not limited to, the number of speakers in an array, the number of speaker arrays, number of speaker frames, the correct height, angle, weight, etc. of the speaker array(s) 20 for deployment in the venue 14.

In operation 66, the first mobile device 18 transmits the speaker installation code 12 via SMS or BLUETOOTH protocol (i.e., without internet connectivity) to other mobile device(s) 40 that are present in the venue 14 so that crew members can start on constructing the speaker array(s) 20 in the venue 14.

Figure 3:
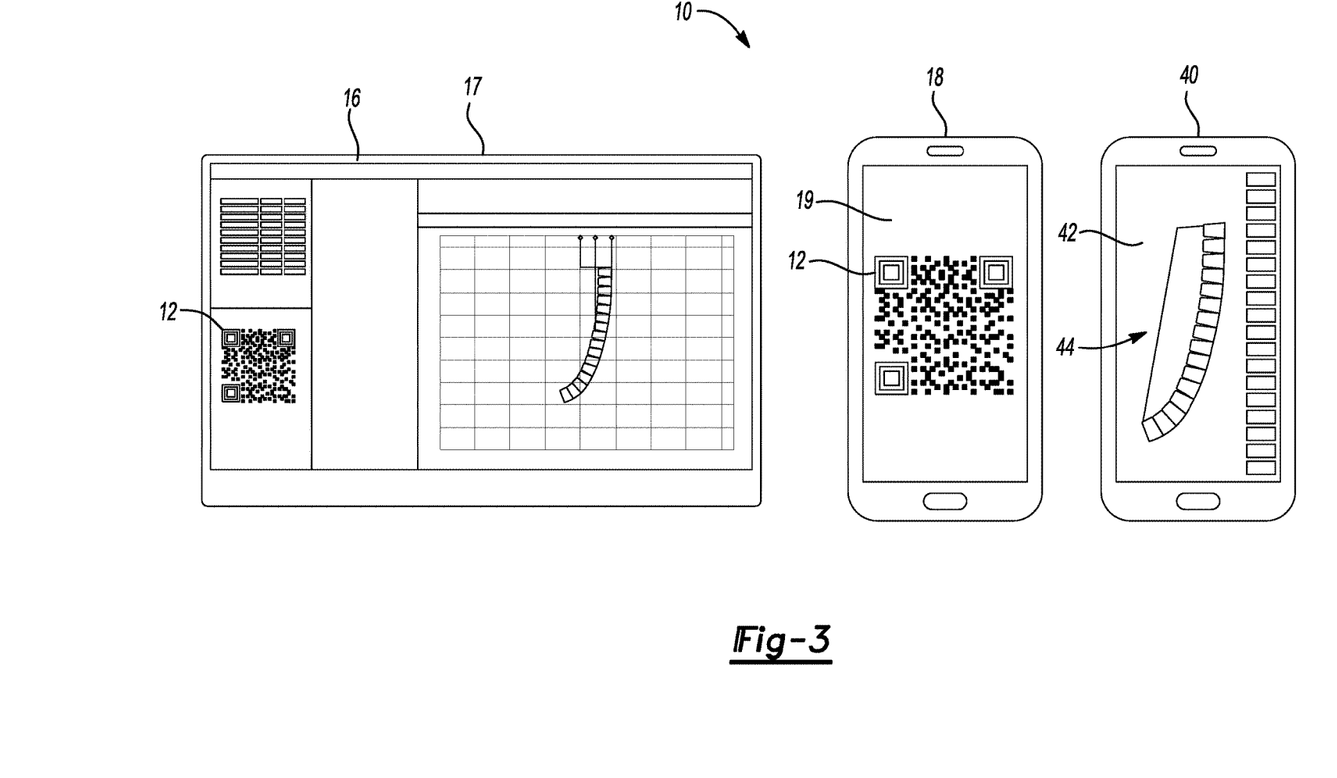
FIG. 3 generally illustrates a high-level implementation of the system for generating and transmitting the speaker installation code in the venue in accordance to one embodiment.

FIG. 3 generally illustrates a high-level implementation of the system 10 for generating and transmitting the speaker installation code 12 in the venue 14 in accordance to one embodiment. The computing device 16 includes a display 17 for visually depicting the speaker installation code 12. As noted above, the computing device 16 executes the speaker prediction software on the prediction array controller 22 to determine optimal placement and positioning of the speaker array(s) 20 based on the venue dimensional layout that is provided to the computing device 16. The speaker installation code 12 is shown as a QR code. As also shown, the computing device 16 also depicts other aspects related to the setup and construction of the speaker array(s) 20 on the display 17.

The first mobile device 18 visually depicts the speaker installation code 12 on a display 19 thereof. The first mobile device 18 may capture an image of the speaker installation code 12 via the image capture device 32. Alternatively, or additionally, the computing device 16 may wirelessly transmit the speaker installation code 12 via BLUETOOTH or other short distance wireless protocol to the first mobile device 18. The first mobile device 18 may then transmit the speaker installation code 12 to other mobile devices 40 via SMS or BLUETOOTH (i.e., without internet connectivity) that belong to crew members or system engineers in the venue 14 to initiate the setup of the speaker array(s) 20 in the venue 14. In the event the mobile devices 40 are too far from the first mobile device 18, the first mobile device 18 may transmit the speaker installation code 12 via SMS to the mobile device(s) 40. Any one or more of the various mobile devices 40 may also include the speaker reader array app to decode the speaker installation parameters of the speaker array(s) 20 that are encoded in the speaker installation code 12. For example, the other mobile device 40 depicts various decoded installation parameters 44 for the speaker array(s) 20 on a corresponding display 42 thereof. The decoded installation parameters 44 for the speaker array(s) 20 may show any number of speaker related attributes such as the number of speakers that form the array, angle, height, box-to-box angles, etc. The first mobile device 18 and/or the other mobile device 40 can execute the speaker array app to generate an inventory list based on the speaker installation code 12. The inventory list may include line-art pictures of components required to suspend the speaker array(s) 20 in the venue 14. These aspects will be discussed in more detail below.

Figure 4:
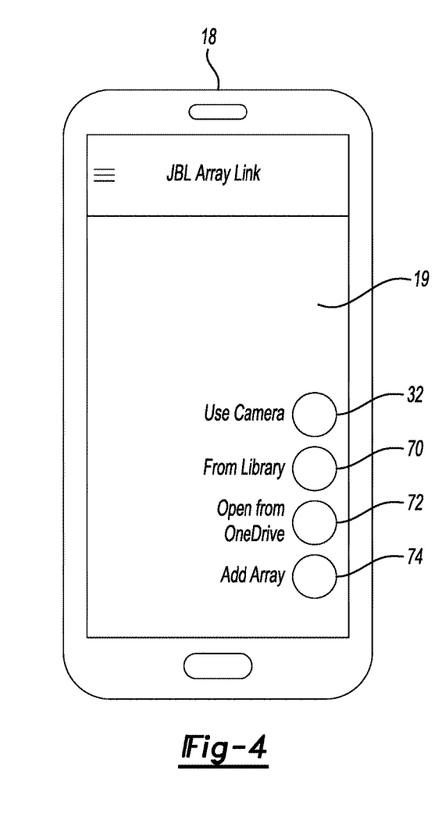
FIG. 4 generally illustrates various file import options available to the mobile device for providing venue and speaker array information in accordance to one embodiment.

FIG. 4 generally illustrates various file import options available to the first mobile device 18 for providing venue and speaker installation parameters in accordance to one embodiment. As noted above, the first mobile device 18 includes an image capture device 32 (or camera) that may be used to capture an image of the speaker installation code 12. In this case, the first mobile device 18 may simply execute the speaker reader array app after capturing the image of the speaker installation code 12 to obtain the speaker array installation parameters for the speaker array(s) 20.

The first mobile device 18 may also enable the crew member to select a library option 70 on the display to access previously stored speaker installation codes 12. The previously stored speaker installation codes 12 may be stored (e.g., the memory device 24) for each venue 14 visited in a tour. This may be advantageous in the event a speaker installation code 12 was previously generated for the venue 14 at an earlier point in time. Thus, the crew member may simply access the speaker installation code 12 that was generated on another occasion to obtain the installation parameters without the need of supplying the dimensional layout of the venue 14 to the computing device 16 to generate a new speaker installation code 12. This may save the crew members time in the setup of the speaker array(s) 20.

The first mobile device 18 may also enable the crew member to select an external server option 72 in which the speaker installation code 12 is stored on an external server such as, but not limited to, Dropbox™ or One Drive™. The first mobile device 18 also includes an add array option 74 whereby the crew member can store a newly received speaker installation code 12 either to the internal memory device 30 or on the external server.

Figure 5:
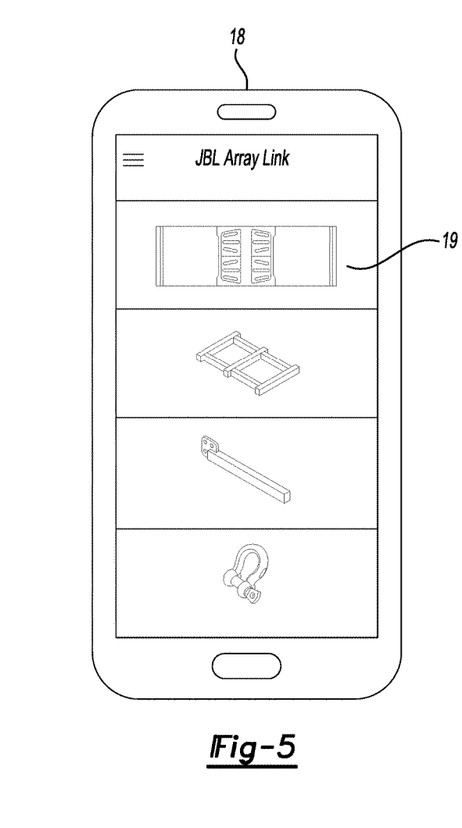
FIG. 5 generally illustrates an array inventory and array view as generated on the mobile device in accordance to one embodiment.

FIG. 5 generally illustrates an array inventory and array view as generated on the first mobile device 18 in accordance to one embodiment. The first mobile device 18, in response to executing the speaker reader array app on the controller 28 and further based on the speaker installation code 12, generates an inventory list of components that are needed to suspend one or more of the speaker arrays 20 from various attachment points in the venue 14. The first mobile device 18 visually depicts each part and corresponding quantity of the parts. For example, the display 19 illustrates an array frame, an extension bar, and a pull back adapter. The array frame is arranged to suspend the speaker array 12. In general, the array frame connects to a top speaker of the speaker array 12 and an electronic motor is attached to the array frame for suspension. The extension bar is a rigging accessory that also aids in suspending the speaker array 12. For example, the extension bar attaches to a main array frame and allows for additional rigging connection points. The pull back adapter is also another rigging accessory that aids in suspending the speaker array 12. The pull back adapter connects to the last speaker within a speaker array 12.

The crew member can scroll down the display 19 of the first mobile device 18 to see all of the identified parts. The crew member may also select the corresponding part to access a specification sheet for the selected product or part. The first mobile device 18 may store specification sheets for any of the parts that are utilized for the speaker array 12 (including the speakers) and for the parts used to attach the speaker array 12 to the venue 14. The first mobile device 18 may generate and store the pictorial representations of the parts. The specification sheets may be obtained from a website of the speaker manufacturer via the first mobile device 18.

While not shown, the first mobile device 18 may also include a multiple number of pages which provide the various parts to attach the speaker array(s) 20 to the venue 14. For example, the crew member may select a corresponding page from a multiple number of pages from the display 19. The multiple number of pages may include all of the parts necessary for attaching the speaker array 20 to the venue 14 if a multiple number of pages are needed to capture all of the parts.

Figure 6:
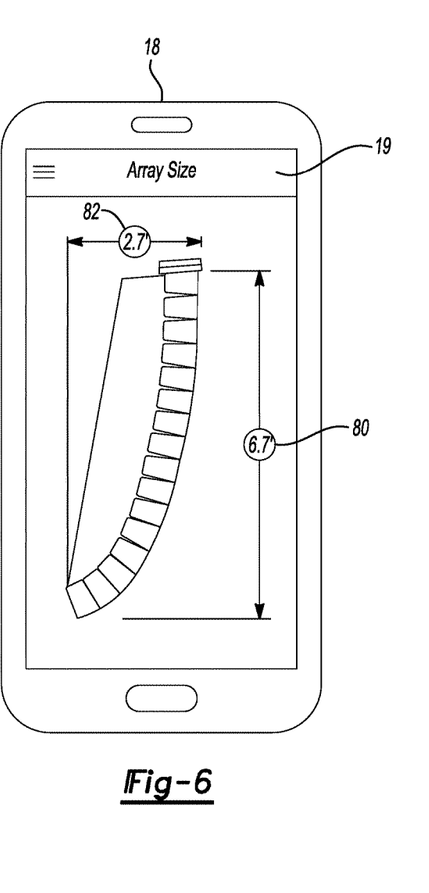
FIG. 6 generally illustrates an array size view as generated on the mobile device in accordance to one embodiment.

FIG. 6 generally illustrates an array size view as generated on the first mobile device 18 in accordance to one embodiment. The first mobile device 18, in response to executing the speaker reader array app on the controller 28 and further based on the speaker installation code 12, generates an array length 80, an array depth 82, an array weight, and a total number of cabinets used to construct the speaker array 20. The array length 80 generally corresponds to a distance between a highest top corner of the speaker array 20 and a lowest bottom corner of the speaker array 20. The array length 80 as depicted on the first mobile device 18 is, for example, 6.7 ft. The array depth 82 corresponds to an overall distance between a furthest front side of the speaker array 20 and furthest rear side of the speaker array 20. The array depth 82 as depicted on the first mobile device 18 is, for example, 2.7 ft. The first mobile device 18 may also provide the array weight which indicates an overall weight of all hardware including frames, level hoists, and pull pack accessories. The total number of cabinets (or speakers) used to construct the speaker array 20 as depicted on the display 19 is, for example, 18. It is recognized that the array length 80, the array depth 82, the array weight, and the total number of cabinets used to construct the speaker array 20 may vary from venue to venue.

Figure 7:
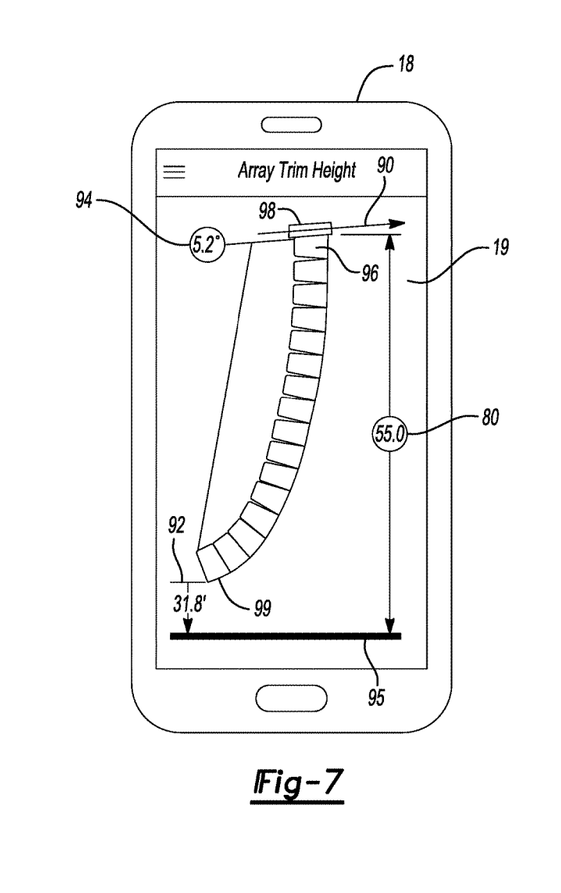
FIG. 7 generally illustrates an array trim height view as generated on the mobile device in accordance to one embodiment.

FIG. 7 generally illustrates an array trim height view as generated on the first mobile device 18 in accordance to one embodiment. The first mobile device 18, in response to executing the speaker reader array app on the controller 28 and further based on the speaker installation code 12, generates a highest point elevation 90, an elevation to bottom of array 92, an top box sight angle 94, and a bottom cabinet sight angle (not shown). The highest point elevation 90 generally corresponds to a distance between the highest point of the speaker array 20 and a floor or ground 95 of the venue 14. The elevation to the bottom of the array 92 corresponds to a distance between the lowest point of the speaker array 20 and the floor 95 of the venue 14. The top box sight angle 94 generally corresponds to an overall angle in degrees of a top cabinet 96 (or top speaker) and an array frame 98. The bottom cabinet sight angle generally corresponds to an overall angle in degrees of the last cabinet 99 (or bottom speaker) of the speaker array 20.

Figure 8:
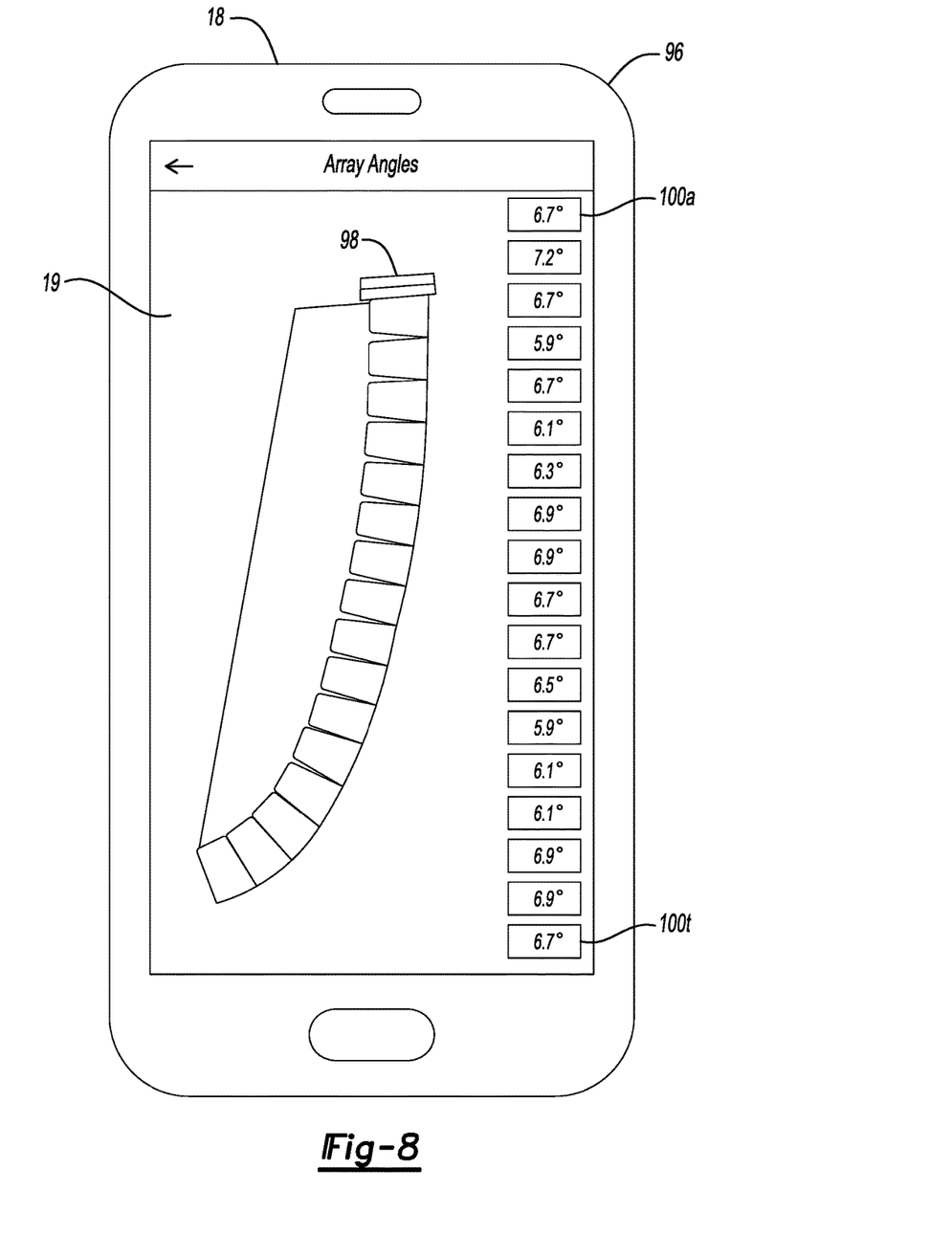
FIG. 8 generally illustrates an array angles view as generated on the mobile device in accordance to one embodiment.

FIG. 8 generally illustrates an array angles view as generated on the first mobile device 18 in accordance to one embodiment. The first mobile device 18, in response to executing the speaker reader array app on the controller 28 and further based on the speaker installation code 12, generates an overall view of all box-to-box angles 100a-100t for the various cabinets (or speakers) that comprise the speaker array 20. As shown, various angles are depicted on the display 19 for the box-to-box angles 100a-100t which indicate the exact position for each speaker in the array 20. Two or more of the angles for the speakers may be different or similar to one another. The first mobile device 18 clearly identifies the position or each angle for a given speaker or cabinet. For example, it may be confusing as to whether a first angle of the cabinet corresponds to either a top cabinet (or speaker) or to an array frame 98. The first mobile device 18 enables the crew member the ability to zoom in and out accordingly for this view and any of the others disclosed herein. The ability to zoom further provides the crew member with detailed specifics regarding the corresponding angles 100a-100t. While FIG. 8 generally depicts a total of 18 speakers or cabinets in the speaker array, it is recognized that any number of cabinets and corresponding angles may be used to construct the speaker array 20. The number of cabinets and corresponding angles may vary based on the particular venue 14.

Figure 9:
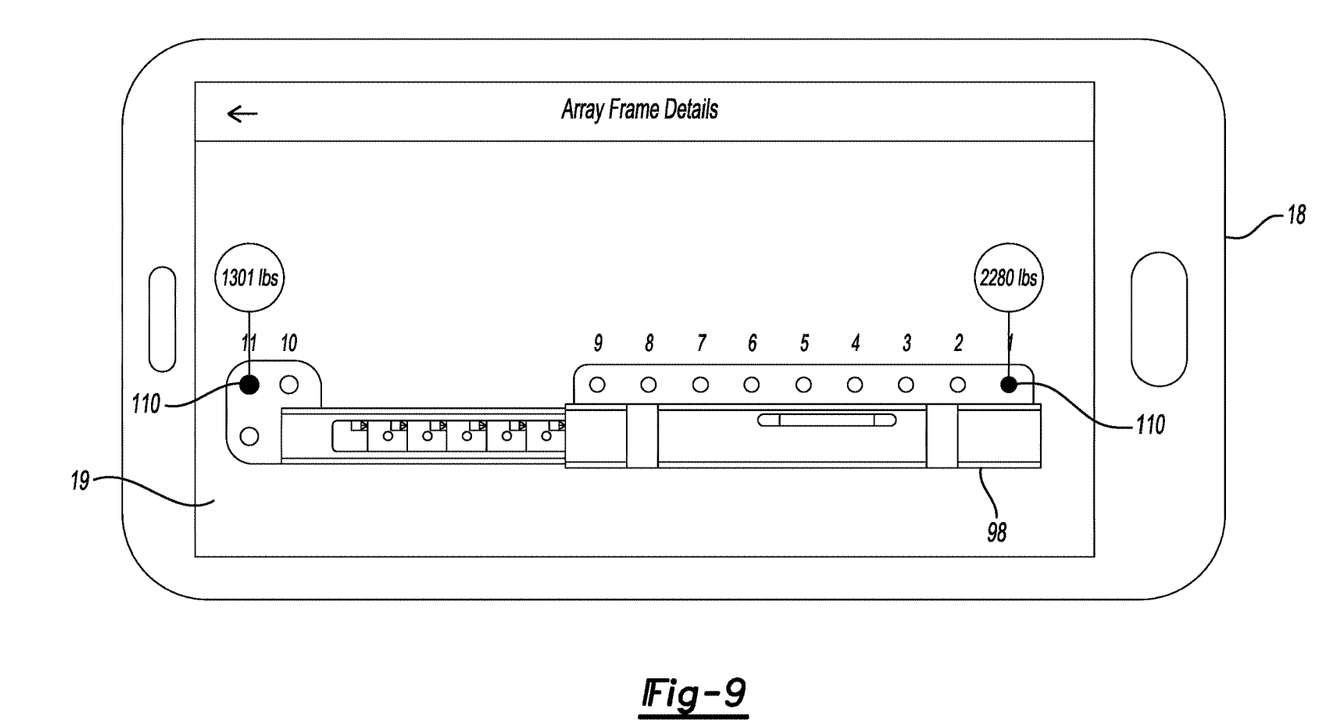
FIG. 9 generally illustrates an array frame detail view as generated on the mobile device in accordance to one embodiment.

FIG. 9 generally illustrates an array frame detail view as generated on the first mobile device 18 in accordance to one embodiment. The first mobile device 18, in response to executing the speaker reader array app on the controller 28 and further based on the speaker installation code 12, generates various details surrounding the frame 98 of the speaker array 20 which includes a dual suspension point or a single suspension point, a single point load, a dual point load, a center of gravity, and an array frame sight angle (not shown). For example, the array frame detail provides an indication as to whether the speaker array 20 uses a dual suspension point or a single suspension point for attachment to a roof or other attachment point of the venue 14. FIG. 9 illustrates for example that a dual suspension point will be required and further illustrates attachment points 110 of the array 20 that are attached to the roof of the venue 14. The first mobile device 18 visually displays the weight for each point in the dual suspension. For example, FIG. 9 further illustrates a dual point load of 1301 lbs. on one end of the array frame 98 and 2280 lbs. on another end of the array frame 98.

The mobile device 18 may also provide a single point load which displays the weight for single point applications. In addition, a center of gravity icon (not shown) may be presented on the display 19 to identify the center of gravity of the speaker array 20 and the frame 98 that is attached to the array 20. The array frame sight angle provides an overall angle in degrees of the frame 98 of the speaker array 20. The array frame sight angle provides information corresponding to an elevation of the entire speaker array 20 or overall aiming of the speakers in the speaker array 20.

While not shown, the first mobile device 18, in response to executing the speaker reader array app on the controller 28 and further based on the speaker installation code 12, is configured to provide various safety and warning features to the crew member. For example, the first mobile device 18 may indicate if an overloading condition may be experienced by adding too much weight with frame accessories or additional speakers that are added to the speaker array 20. The display 19 may also orientate the frame 98 for the speaker array 20 in either a landscape or portrait mode.

Figure 10:
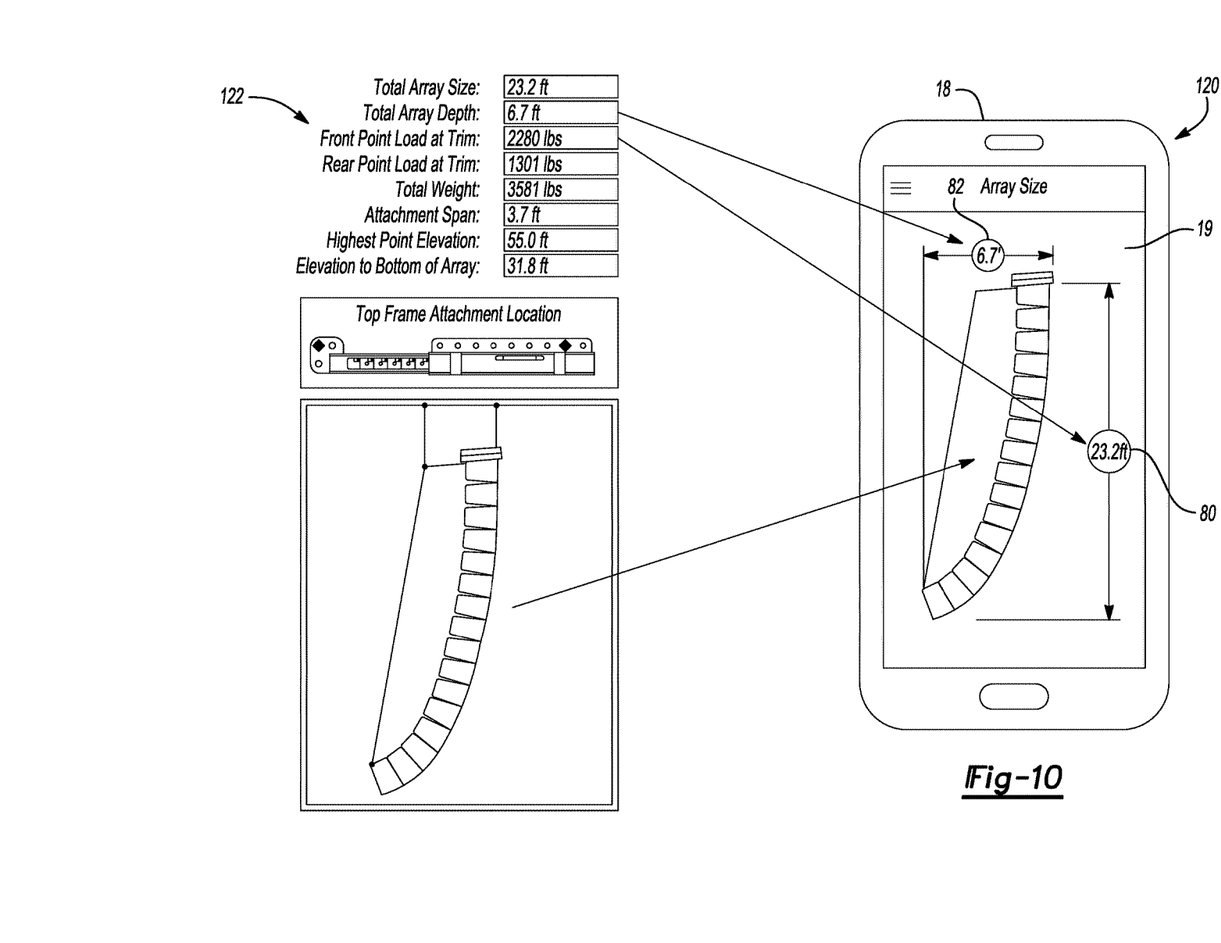
FIG. 10 generally illustrates a graphical illustration of the array size screen on the mobile device in comparison to a working file of array information in accordance to one embodiment.

FIG. 10 generally illustrates a graphical illustration of the array size screen on the first mobile device 18 as generally shown at 120 in comparison to an actual working file of array information by the computing device 16 as generally shown at 122 in accordance to one embodiment. In general, the computing device 16 is generally configured to generate a line array calculator (LAC) in response to the dimensional layout of the venue 14. The computing device 16 provides the speaker installation code 12 to the first mobile device 18. The first mobile device 18 executes the speaker array app on the controller 28 and decodes the speaker installation code 12 to generate the contents as illustrated on the display 19 of the first mobile device 18. As can be seen, the total array depth 82 is depicted as 6.7 ft. on the display 19 and the total array size (or array length 80) is 23.2 ft. on the display 19. The first mobile device 18 recreates the view of the speaker array 20 depicted on the computing device 16 on the display 19.

Figure 11:
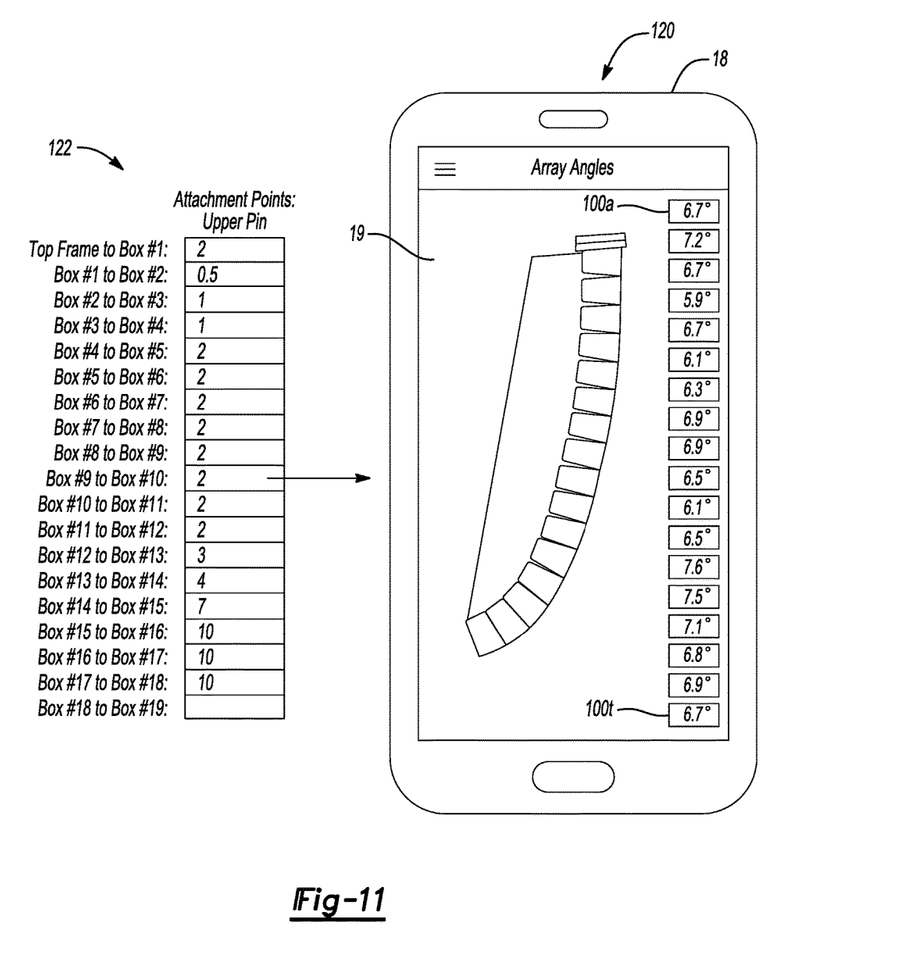
FIG. 11 generally illustrates a graphical illustration of array angles screen on the mobile device in comparison to a working file of attachment points of speaker boxes and a speaker frame.

FIG. 11 generally illustrates a graphical illustration of array angles screen on the first mobile device 18 as generally shown at 120 in comparison to an actual working computer file of array information on the computing device 16 as generally shown at 122 in accordance to one embodiment.

Figure 12:
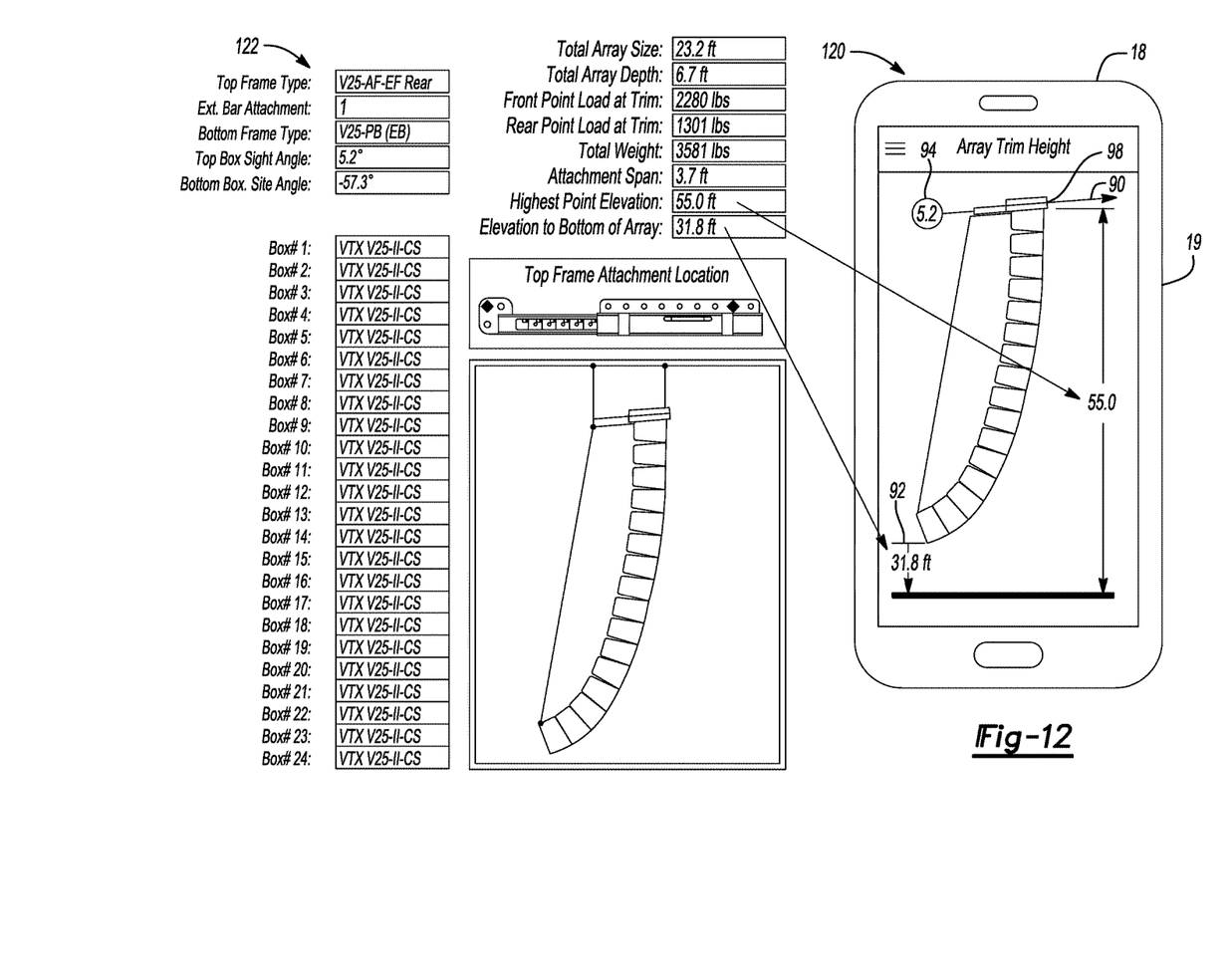
FIG. 12 generally illustrates a graphical illustration of array trim height screen on the mobile device in comparison to a working file for speaker boxes in accordance to one embodiment.

FIG. 12 generally illustrates a graphical illustration of an array trim height screen on the first mobile device 18 as generally shown at 120 in comparison to an actual working file for speaker boxes on the computing device 16 as generally shown at 122 in accordance to one embodiment. As noted above, the computing device 16 is generally configured to generate the LAC in response to the dimensional layout of the venue 14. The computing device 16 provides the speaker installation code 12 to the first mobile device 18. The first mobile device 18 executes the speaker array app on the controller 28 and decodes the speaker installation code 12 to generate the contents as illustrated on the display 19 of the first mobile device 18. As shown, the highest point elevation 90 corresponds to 55 ft, the elevation to bottom of array 92 corresponds to 31.8 ft., and the top box sight angle 94 corresponds to 5.2 degrees.

Figure 13:
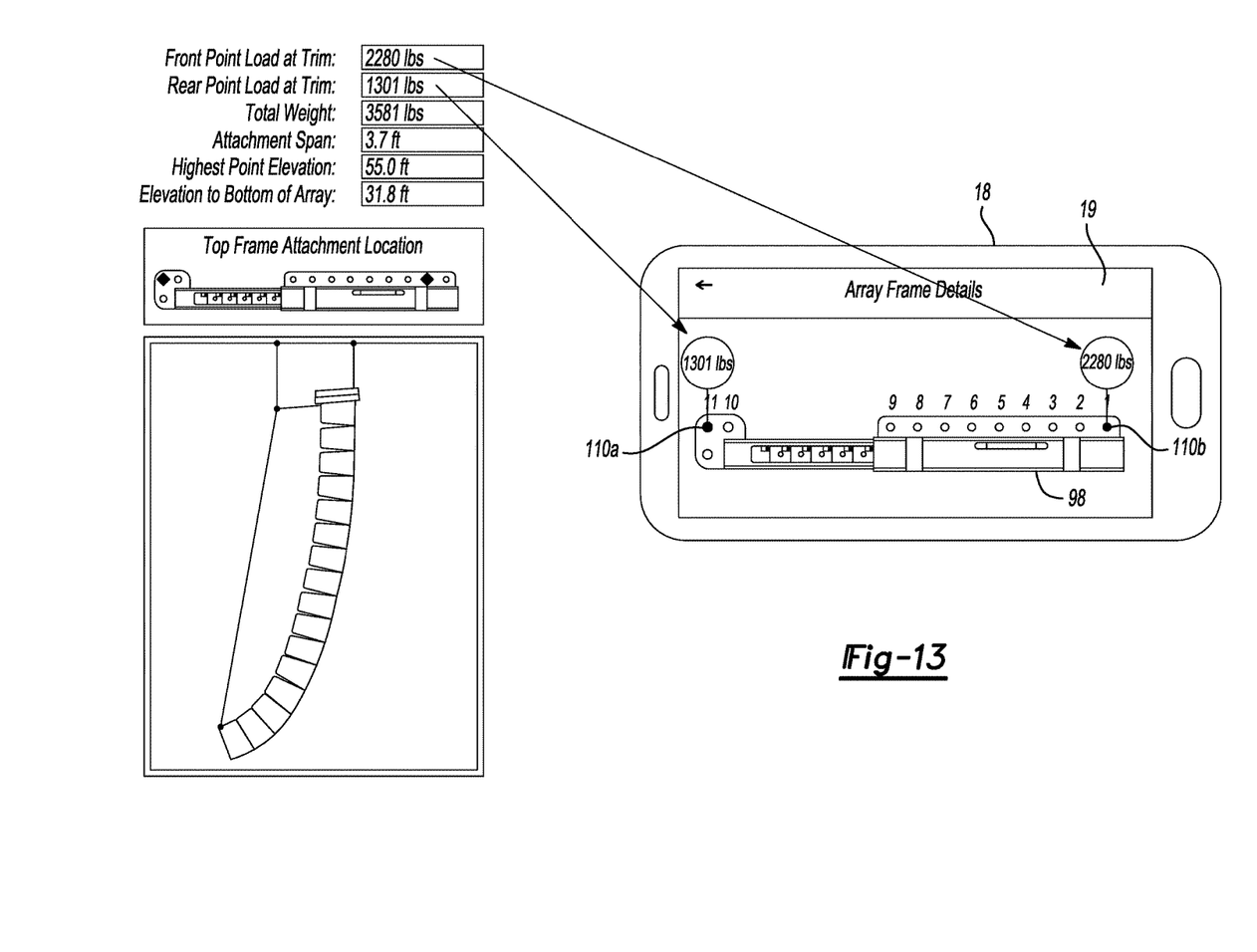
FIG. 13 generally illustrates a graphical illustration of an array frame details screen on the mobile device in comparison to a working file in accordance to one embodiment.

FIG. 13 generally illustrates a graphical illustration of an array frame details screen on the first mobile device 18 as generally shown at 120 in comparison to actual working file on the computing device 16 as generally shown at 122 accordance to one embodiment. As noted above, the computing device 16 is generally configured to generate the LAC in response to the dimensional layout of the venue 14. The computing device 16 provides the speaker installation code 12 to the first mobile device 18. The first mobile device 18 executes the speaker array app on the controller 28 and decodes the speaker installation code 12 to generate the contents as illustrated on the display 19 of the first mobile device 18. As shown, FIG. 13 illustrates that use of a dual suspension array frame 98. The attachment point 110a corresponds to a first point of the array frame 98 that is attached to an underside of the roof of the venue 14 having a front point load of 2280 lbs. The attachment point 110b corresponds to a second point of the array frame 98 that is attached to an underside of the roof of the venue 14 having a rear point load of 1301 lbs.

While exemplary embodiments are described above, it is not intended that these embodiments describe all possible forms of the invention. Rather, the words used in the specification are words of description rather than limitation, and it is understood that various changes may be made without departing from the spirit and scope of the invention.

Additionally, the features of various implementing embodiments may be combined to form further embodiments of the invention.

What is claimed is:

1. An apparatus for generating a speaker installation code for a speaker array in a venue, the apparatus comprising:
    a memory device; and
    a controller being operably coupled to the memory device and programmed to:
        receive venue dimensional layout information for the venue;
        generate a speaker installation code corresponding to speaker array installment parameters for the speaker array in the venue based on the venue dimensional layout information; and
        transmit the speaker installation code to one or more mobile devices to provide the speaker array installment parameters for the speaker array in the venue to the one or more mobile devices.

2. The apparatus of claim 1, wherein the controller is further programmed to receive the venue dimensional layout information from one of a user input and a laser measurement tool.

3. The apparatus of claim 1, wherein the speaker installation code is one of a bar code and a quick response (QR) code.

4. The apparatus of claim 1, wherein the controller is further programmed to determine a placement and a position of the speaker array in the venue based on the venue dimensional layout information.

5. The apparatus of claim 1, wherein the controller is further programmed to generate one or more of a number of speakers in an array, a number of speaker arrays, a number of speaker frames, a height of the speaker array for deployment in the venue, an angle of the speaker array for deployment in the venue, and a weight of the speaker array for deployment in the venue based on the venue dimensional layout information.

6. The apparatus of claim 5, wherein the controller is further configured to encode data corresponding to the one or more of the number of speakers in an array, the number of speaker arrays, the number of speaker frames, the height of the speaker array for deployment in the venue, the angle of the speaker array for deployment in the venue, and the weight of the speaker array for deployment in the venue to generate the speaker installation code.

7. The apparatus of claim 6, wherein the controller is further configured to generate the speaker installation code with the encoded data.

8. The apparatus of claim 1, wherein the controller is further programmed to transmit the speaker installation code to the one or more mobile devices in response to a control signal from the one or more mobile devices.

9. A computer-program product embodied in a non-transitory computer readable medium that is programmed to generate a speaker installation code for a speaker array in a venue, the computer-program product comprising instructions to:
    receive venue dimensional layout information for the venue;
    generate a speaker installation code corresponding to speaker array installment parameters for the speaker array in the venue based on the venue dimensional layout information; and
    transmit the speaker installation code to one or more mobile devices to provide the speaker array installment parameters for the speaker array in the venue to the one or more mobile devices.

10. The computer-program product of claim 9 further comprising instructions to to receive the venue dimensional layout information from one of a user input and a laser measurement tool.

11. The computer-program product of claim 9, wherein the speaker installation code is one of a bar code and a quick response (QR) code.

12. The computer-program product of claim 9 further comprising instructions to to determine a placement and a position of the speaker array in the venue based on the venue dimensional layout information.

13. The computer-program product of claim 9 further comprising instructions to generate one or more of a number of speakers in an array, a number of speaker arrays, a number of speaker frames, a height of the speaker array for deployment in the venue, an angle of the speaker array for deployment in the venue, and a weight of the speaker array for deployment in the venue based on the venue dimensional layout information.

14. The computer-program product of claim 13 further comprising instructions to encode data corresponding to the one or more of the number of speakers in an array, the number of speaker arrays, the number of speaker frames, the height of the speaker array for deployment in the venue, the angle of the speaker array for deployment in the venue, and the weight of the speaker array for deployment in the venue.

15. The computer-program product of claim 14 further comprising instructions to generate the speaker installation code with the encoded data.

16. The computer-program product of claim 9 further comprising instructions to transmit the speaker installation code to the one or more mobile devices in response to a control signal from the one or more mobile devices.

17. An apparatus for receiving a speaker installation code for a speaker array in a venue, the apparatus comprising:
    a mobile device including:
        a memory device; and
        a controller being operably coupled to the memory device and programmed to:
            receive a speaker installation code from a computing device, the speaker installation code corresponding to speaker array installment parameters for the speaker array in the venue; and
            provide the speaker installation code on a display to provide the speaker array installment parameters for the speaker array in the venue.

18. The apparatus of claim 17 wherein the mobile device is programmed to receive the speaker installation code as encoded data.

19. The apparatus of claim 18 wherein the mobile device is further configured to decode the encoded data to provide information corresponding to one or more of a number of speakers in an array, a number of speaker arrays, a number of speaker frames, a height of the speaker array for deployment in the venue, an angle of the speaker array for deployment in the venue, and a weight of the speaker array for deployment in the venue.

20. The apparatus of claim 17 wherein the mobile device further includes an image capture device configured to capture an image of the speaker installation code from the computing device.

* * * * *